United States Patent [19]

Fesman et al.

[11] Patent Number: 5,547,614
[45] Date of Patent: Aug. 20, 1996

[54] FLAME RETARDANT MIXTURE OF POLYBROMINATED DIPHENYL OXIDE AND ORGANIC DIPHOSPHATE

[75] Inventors: Gerald Fesman, Teaneck, N.J.; Alan M. Aaronson, Flushing Meadows, N.Y.

[73] Assignee: Akzo Nobel N.V., Arnhem, Netherlands

[21] Appl. No.: 324,862

[22] Filed: Oct. 18, 1994

Related U.S. Application Data

[63] Continuation of Ser. No. 436,285, Nov. 14, 1989, abandoned.

[51] Int. Cl.⁶ .......................... C09K 21/08; C09K 21/12
[52] U.S. Cl. ............................... 252/609; 252/601
[58] Field of Search ........................ 558/164; 252/609

[56] References Cited

U.S. PATENT DOCUMENTS

| | | | |
|---|---|---|---|
| 2,736,737 | 2/1956 | Morris | 558/164 |
| 2,782,128 | 2/1957 | Paist et al. | 558/164 |
| 3,869,526 | 3/1975 | Combey et al. | 558/164 |
| 4,032,498 | 6/1977 | Dany et al. | 558/164 |
| 4,433,071 | 2/1984 | Fesman | 252/609 |
| 4,565,833 | 1/1986 | Buszard et al. | 252/609 |
| 4,746,682 | 5/1988 | Green | 521/107 |
| 4,806,571 | 2/1989 | Knobel et al. | 521/107 |

FOREIGN PATENT DOCUMENTS

49/40342  4/1974  Japan ..................... 558/164

*Primary Examiner*—Philip Tucker
*Assistant Examiner*—Joseph D. Anthony
*Attorney, Agent, or Firm*—Richard P. Fennelly; Louis A. Morris

[57] ABSTRACT

A flame retardant mixture, suitable for use in polyurethane foams, comprises a polybrominated diphenyl oxide (e.g., pentabromodiphenyl oxide) and an organic diphosphate (e.g., an aromatic diphosphate). A small amount of triaryl phosphate can also be present for viscosity reduction purposes.

7 Claims, No Drawings

FLAME RETARDANT MIXTURE OF POLYBROMINATED DIPHENYL OXIDE AND ORGANIC DIPHOSPHATE

This is a continuing of application Ser. No. 07/436,285 filed Nov. 14, 1989 now abandoned.

BACKGROUND OF THE INVENTION

U.S. Pat. No. 4,746,682 to J. Green relates to a polyurethane flame retardant containing a polybrominated diphenyl oxide and an alkylated triaryl phosphate ester.

Certain disclosures exist in the prior art in regard to organic diphosphates of the general class

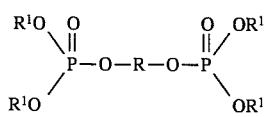

where R can be substituted or unsubstituted alkylene, arylene, alkylene arylene, or other divalent connecting radical (e.g., diphenylene sulfone —SO—, —S—, —SO$_2$—), and the like and R$^1$ can be substituted or unsubstituted aryl or alkyl. Examples of some disclosures include the following: U.S. Pat. Nos. 3,492,373; 3,869,526; and 4,203,888; British Patent No. 2,061,949; and Japanese Patent Publication Nos. 57/174,331; 71/22,584; 74/40,342; and 82/55,947. Also intended to be included within this class of compound are copending U.S. Ser. No. 374,717, filed Jul. 3, 1989, entitled "Novel Aromatic Bisphosphates" which covers compounds where R$^1$ are aryl and R is —C$_6$H$_4$SO$_2$H$_4$— and U.S. Ser. No. 374,716, filed Jul. 3, 1989, also entitled "Novel Aromatic Bisphosphates" which covers compounds where R$^1$ are also aryl and R is a neopentyl group or a neopentyl group which is halogen substituted.

DESCRIPTION OF THE INVENTION

The invention relates to a flame retardant mixture of a polybrominated diphenyl oxide and an organic diphosphate of the aforementioned type. This flame retardant is effective in polyurethane foams.

The polybrominated diphenyl oxide component is described in U.S. Pat. No. 4,746,682 to J. Green which is incorporated herein by reference. A particularly preferred component of this type is pentabromodiphenyl oxide which is a mixture of pentabromodiphenyl oxide containing about 71% bromine. The amount of this component in the flame retardant mixture of the present invention can range from about 50% to about 85%, by weight of the mixture.

A preferred type of organic diphosphate compound for use herein is of the formula

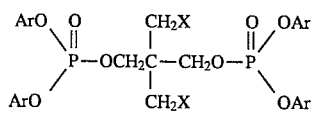

Some representative compounds of this type include compounds of the formula

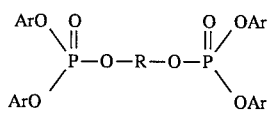

or

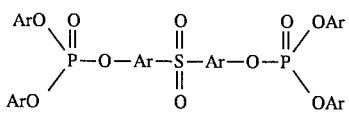

where Ar is preferably unsubstituted aryl and X is either hydrogen or halogen (e.g., chlorine or bromine). Methods for forming these compounds are known. Preferred routes include those covered in U.S. Ser. No. 374,718, filed Jul. 3, 1989, entitled "Process for Making Hydrocarbyl Bisphosphates" and U.S. Ser. No. 374,719, filed Jul. 3, 1989, entitled "Formation of Glycol Bisphosphate Compounds", each of which is incorporated herein by reference. The amount of organic diphosphate component in the mixture can range from about 15% to about 50% by weight of the mixture.

In accordance with one embodiment of the invention, it is possible to also add a triaryl phosphate (e.g., triphenyl phosphate) to the instant flame retardant mixture in relatively small amount, e.g., up to about 20%, by weight, in order to provide a lowered viscosity to the overall blend. In this manner, the use of the organic diphosphate in combination with the low level of triaryl phosphate accomplishes both a reduction in the viscosity of the polybrominated diphenyl oxide-containing mixture rendering it more pumpable, for example, and improves the flame retardant performance of the resulting polyurethane foam.

The instant invention relates to flame retardant additives suitable for use in polyurethane foams which overcome the problems inherent in foam processability due to the high viscosity of polybrominated diphenyl oxide additives. The flame retardants of the invention produce reduced scorch discoloration in the final foam and supply sufficient flame retardant efficiency to meet the flame retardancy requirements of California Tech Bulletin 117. In the instant flame retardant mixture, the flame retardant efficiency is maintained by the combination of phosphorus and bromine.

The instant invention is further understood by the Examples which follow.

EXAMPLE 1

This Example describes the foam formulations which were used to produce foams having densities of 1.30 (Foam A) and 1.60 (Foam B) lbs/ft$^3$, respectively (all additives in parts by weight):

| Additives | A | B |
|---|---|---|
| Polyether polyol (NIAX 1656 brand) | 100 | 100 |
| Flame Retardant | 14 | 14 |
| Water | 3.85 | 4.50 |
| Methylene chloride | 1.5 | 1.5 |
| Triethylenediamine dipropylene glycol | — | 0.30 |
| N-ethyl morpholine | 1.30 | 0.20 |
| Silicone surfactant | 1.40 | 1.10 |
| Stannous octoate (50%) | 0.42 | 0.48 |
| Toluene diisocyanate (111 index) | 51.0 | 58.0 |

EXAMPLE 2

The Table given below sets forth the viscosity of the various blends tested and the flammability test results. The use level in all cases was 14 parts per hundred parts of polyol on a weight basis:

| Blend | Viscosity (cps at 25° C.) | Burn Time* (sec) | Burn Length* (inches) |
|---|---|---|---|
| A | 2500 | 0 | 2.4 |
| B | 9000 | 0 | 2.5 |
| C | 2040 | 0.6 | 2.7 |
| D | 4000 | 0 | 2.3 |

Note: Blend A comprised 70 wt % of pentabromodiphenyl oxide, 20 wt % of resorcinol bis diphenyl phosphate, and 10 wt % of triphenyl phosphate. Blend B was the same as Blend A with the 10% of triphenyl phosphate replaced with an additional 10% of the diphosphate. Blends C and D were the same as A and B, respectively, with the diphosphate in each case being neopentylglycol bis diphenyl phosphate. These blends were all tested in the 1.6 lbs/ft$^3$ foam.
*The burn test was in accordance with California Tech Bulletin 117.

The following tests were conducted in the 1.3 lbs/ft$^3$ foam using certain of the above blends:

| Blend | Burn Time* (sec) | Burn Length* (inches) |
|---|---|---|
| A | 2.2 | 3.7 |
| C | 1.4 | 3.4 |

*The burn test was in accordance with California Tech Bulletin 117.

For comparison, a prior art blend of 70 wt % pentabromodiphenyl oxide and 30 wt % of isopropyl triphenyl phosphate (PHOSFLEX 41P brand from Akzo Chemicals Inc.) gave a burn time of 1.2 sec and a burn length of 2.9.

We claim:

1. A flame retardant mixture for polymers which consists essentially of: (a) a polybrominated diphenyl oxide; (b) an organic diphosphate of the formula:

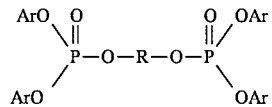

where Ar is substituted or unsubstituted aryl and R is alkylene; and (c) up to 20% by weight of triaryl phosphate.

2. A mixture as claimed in claim 1 wherein (a) is pentabromodiphenyl oxide.

3. A mixture as claimed in claim 1 wherein Ar is unsubstituted aryl and R is branched alkylene.

4. A mixture as claimed in claim 3 wherein R is neopentyl.

5. A mixture as claimed in claim 1 wherein the weight ratio of (a) to (b) is from about 50:50 to about 85:15.

6. A mixture as claimed in claim 5 wherein Ar is unsubstituted aryl, R is branched alkylene, and (b) is pentabromodiphenyl oxide.

7. A mixture as claimed in claim 6 wherein R is neopentyl.

* * * * *